US006757368B2

(12) United States Patent
Binder

(10) Patent No.: US 6,757,368 B2
(45) Date of Patent: Jun. 29, 2004

(54) TELEPHONE OUTLET FOR IMPLEMENTING A LOCAL AREA NETWORK OVER TELEPHONE LINES AND A LOCAL AREA NETWORK USING SUCH OUTLETS

(75) Inventor: Yehuda Binder, Hod HaSharon (IL)

(73) Assignee: Serconet Ltd., Raanana (IL)

( * ) Notice: Subject to any disclaimer, the term of this patent is extended or adjusted under 35 U.S.C. 154(b) by 0 days.

(21) Appl. No.: 10/412,251

(22) Filed: Apr. 14, 2003

(65) Prior Publication Data

US 2003/0179868 A1 Sep. 25, 2003

Related U.S. Application Data

(63) Continuation of application No. 09/531,692, filed on Mar. 20, 2000, now Pat. No. 6,549,616.

(51) Int. Cl.[7] .............................................. H04M 11/00
(52) U.S. Cl. .................................. 379/90.01; 379/93.05
(58) Field of Search ........................... 379/93.05, 93.06, 379/93.07, 93.08, 90.01, 93.28, 399.01, 399.02, 442

(56) References Cited

U.S. PATENT DOCUMENTS

| | | | | |
|---|---|---|---|---|
| 5,599,206 A | * | 2/1997 | Slack et al. ................. | 439/536 |
| 5,930,340 A | * | 7/1999 | Bell ........................... | 379/93.08 |
| 5,960,066 A | * | 9/1999 | Hartmann et al. ......... | 379/93.08 |
| 6,137,865 A | * | 10/2000 | Ripy et al. ................. | 379/93.05 |
| 6,216,160 B1 | * | 4/2001 | Dichter ....................... | 709/221 |
| 6,549,616 B1 | * | 4/2003 | Binder ........................ | 379/90.01 |

FOREIGN PATENT DOCUMENTS

| | | |
|---|---|---|
| WO | 98 02985 | 1/1998 |
| WO | 99 03255 | 1/1999 |
| WO | 99 12330 | 3/1999 |

* cited by examiner

Primary Examiner—Stella Woo
(74) Attorney, Agent, or Firm—Browdy and Neimark

(57) ABSTRACT

A local area network using the telephone wiring within a residence or other building simultaneously with telephony signals, with network outlets having telephone and data connectors allowing connection of Data Terminal Equipment to the network. The network outlets use high pass filters to access the high-frequency band across the media, whereas the standard telephone service uses low pass filters to access the low-frequency voice/analog telephony band across the same media. The high pass filters of the network outlets at each segment end are connected to modems or other Data Communication Equipment, thus supporting data communication networks of various topologies, including point-to-point topologies. The invention also contemplates a network outlet having a data interface connector for allowing connection of Data Terminal Equipment thereto and having a telephone connector for connecting a standard telephone thereto. A splitter is adapted to be connected to a telephone line for separating data and telephone signals transported on the telephone line, whilst a coupler is adapted to receive telephone and data signals and feeds a composite signal at an output thereof to the telephone line.

16 Claims, 11 Drawing Sheets

TELEPHONE OUTLET FOR IMPLEMENTING A LOCAL AREA NETWORK OVER TELEPHONE LINES AND A LOCAL AREA NETWORK USING SUCH OUTLETS

This is a continuation of patent application Ser. No. 09/531,692, filed Mar. 20, 2000 now U.S. Pat. No. 6,549,616.

FIELD OF THE INVENTION

The present invention relates to the field of wired communication systems, and, more specifically, to the networking of devices using telephone lines.

BACKGROUND OF THE INVENTION

FIG. 1 shows the wiring configuration for a prior-art telephone system 10 for a residence or other building, wired with a telephone line 5. Residence telephone line 5 consists of single wire pair which connects to a junction-box 16, which in turn connects to a Public Switched Telephone Network (PSTN) 18 via a cable 17, terminating in a public switch 19, apparatus which establishes and enables telephony from one telephone to another. The term "analog telephony" herein denotes traditional analog low-frequency audio voice signals typically under 3 KHz, sometimes referred to as "POTS" ("plain old telephone service"), whereas the term "telephony" in general denotes any kind of telephone service, including digital service such as Integrated Services Digital Network (ISDN). The term "high-frequency" herein denotes any frequency substantially above such analog telephony audio frequencies, such as that used for data. ISDN typically uses frequencies not exceeding 100 Khz (typically the energy is concentrated around 40 Khz). The term "telephone line" herein denotes electrically-conducting lines which are intended primarily for the carrying and distribution of analog telephony, and includes, but is not limited to, such lines which may be pre-existing within a building and which may currently provide analog telephone service. The term "telephone device" herein denotes, without limitation, any apparatus for telephony (including both analog telephony and ISDN), as well as any device using telephony signals, such as fax, voice-modem, and so forth.

Junction box 16 is used to separate the in-home circuitry from the PSTN and is used as a test facility for troubleshooting as well as for wiring new telephone outlets in the home. A plurality of telephones 13a, 13b, and 13c connects to telephone line 5 via a plurality of telephone outlets 11a, 11b, 11c, and 11d. Each telephone outlet has a connector (often referred to as a "jack"), denoted in FIG. 1 as 12a, 12b, 12c, and 12d, respectively. Each telephone outlet may be connected to a telephone via a connector (often referred to as a "plug"), denoted in FIG. 1 (for the three telephone illustrated) as 14a, 14b, and 14c, respectively. It is also important to note that lines 5a, 5b, 5c, 5d, and 5e are electrically the same paired conductors.

There is a requirement for using the existing telephone infrastructure for both telephone and data networking. In this way, the task of establishing a new local area network in a home or other building is simplified, because there would be no additional wires to install. U.S. Pat. No. 4,766,402 to Crane (hereinafter referred to as "Crane") teaches a way to form LAN over two-wire telephone lines, but without the telephone service.

The concept of frequency domain/division multiplexing (FDM) is well-known in the art, and provides means of splitting the bandwidth carried by a wire into a low-frequency band capable of carrying an analog telephony signal and a high-frequency band capable of carrying data communication or other signals. Such a mechanism is described for example in U.S. Pat. No. 4,785,448 to Reichert et al. (hereinafter referred to as "Reichert"). Also is widely used are xDSL systems, primarily Asymmetric Digital Subscriber Loop (ADSL) systems.

Relevant prior art in this field is also disclosed in U.S. Pat. No. 5,896,443 to Dichter (hereinafter referred to as "Dichter"). Dichter is the first to suggest a method and apparatus for applying such a technique for residence telephone wiring, enabling simultaneously carrying telephone and data communication signals. The Dichter network is illustrated in FIG. 2, which shows a network 20 serving both telephones and a local area network. Data Terminal Equipment (DTE) units 24a, 24b, and 24c are connected to the local area network via Data Communication Equipment (DCE) units 23a, 23b, and 23c, respectively. Examples of Data Communication Equipment include modems, line drivers, line receivers, and transceivers. DCE units 23a, 23b, and 23c are respectively connected to high pass filters (HPF) 22a, 22b, and 22c. The HPF's allow the DCE units access to the high-frequency band carried by telephone line 5. In a first embodiment (not shown in FIG. 2), telephones 13a, 13b, and 13c are directly connected to telephone line 5 via connectors 14a, 14b, and 14c, respectively. However, in order to avoid interference to the data network caused by the telephones, a second embodiment is suggested (shown in FIG. 2), wherein low pass filters (LPF's) 21a, 21b, and 21c are added to isolate telephones 13a, 13b, and 13c from telephone line 5. Furthermore, a low pass filter must also be connected to Junction-Box 16, in order to filter noises induced from or to the PSTN wiring 17. As is the case in FIG. 1, it is important to note that lines 5a, 5b, 5c, 5d, and 5e are electrically the same paired conductors.

However, the Dichter network suffers from degraded data communication performance, because of the following drawbacks:

1. Induced noise in the band used by the data communication network is distributed throughout the network. The telephone line within a building serves as a long antenna, receiving electromagnetic noise produced from outside the building or by local equipment such as air-conditioning systems, appliances, and so forth. Electrical noise in the frequency band used by the data communication network can be induced in the extremities of telephone line 5 (line 5c or 5a in FIG. 2) and propagated via telephone line 5 throughout the whole system. This is liable to cause errors in the data transportation.

2. The wiring media consists of a single long wire (telephone line 5). In order to ensure a proper impedance match to this transmission-line, it is necessary to install terminators at each end of telephone line 5. One of the advantages of using the telephone infrastructure for a data network, however, is to avoid replacing the internal wiring. Thus, either such terminators must be installed at additional cost, or suffer the performance problems associated with an impedance mismatch.

3. In the case where LPF 21 is not fitted to the telephones 13, each connected telephone appears as a non-terminated stub, and this is liable to cause undesirable signal reflections.

4. In one embodiment, LPF 21 is to be attached to each telephone 13. In such a configuration, an additional modification to the telephone itself is required. This further makes the implementation of such system complex and costly, and defeats the purpose of using an existing telephone line and telephone sets 'as is' for a data network.

5. The data communication network used in the Dichter network supports only the 'bus' type of data communication network, wherein all devices share the same physical media. Such topology suffers from a number of drawbacks, as described in U.S. Pat. No. 5,841,360 to the present inventor, which is incorporated by reference for all purposes as if filly set forth herein. Dichter also discloses drawbacks of the bus topology, including the need for bus mastering and logic to contend with the data packet collision problem. Topologies that are preferable to the bus topology include the Token-Ring (IEEE 803), the PSIC network according to U.S. Pat. No. 5,841,360, and other point-to-point networks known in the art (such as a serial point-to-point 'daisy chain' network). Such networks are in most cases superior to 'bus' topology systems.

The above drawbacks affect the data communication performance of the Dichter network, and therefore limit the total distance and the maximum data rate such a network can support. In addition, the Dichter network typically requires a complex and therefore costly transceiver to support the data communication system. While the Reichert network relies on a star topology and does not suffer from these drawbacks of the bus topology, the star topology also has disadvantages. First, the star topology requires a complex and costly hub module, whose capacity limits the capacity of the network. Furthermore, the star configuration requires that there exist wiring from every device on the network to a central location, where the hub module is situated. This may be impractical and/or expensive to achieve, especially in the case where the wiring of an existing telephone system is to be utilized. The Reichert network is intended for use only in offices where a central telephone connection point already exists. Moreover, the Reichert network requires a separate telephone line for each separate telephone device, and this, too, may be impractical and/or expensive to achieve.

Although the above-mentioned prior-art networks utilize existing in-home telephone lines and feature easy installation and use without any additions or modifications to the telephone line infrastructure (wires, outlets, etc.), they require dedicated, non-standard, and complex DCE's, modems, and filters, and cannot employ standard interfaces. For example, Ethernet (such as IEEE802.3) and other standards are commonly used for personal computers communication in Local Area network (LAN) environments. With prior-art techniques, in order to support communication between computers, each computer must be equipped with an additional modem for communicating over the telephone line. Whether these additional modems are integrated into the computer (e.g. as plug-in or built-in hardware) or are furnished as external units between the computer and the telephone line, additional equipment is required. The prior-art networks therefore incur additional cost, space, installation labor, electricity, and complexity. It would therefore be desirable to provide a network which contains integral therewith the necessary standard interfaces, thereby obviating the need to provide such interfaces in the DTE's.

There is thus a widely-recognized need for, and it would be highly advantageous to have, a means for implementing a data communication network using existing telephone lines of arbitrary topology, which continues to support analog telephony, while also allowing for improved communication characteristics by supporting a point-to-point topology network.

Furthermore, there is also a need for, and it would be highly advantageous to have, a means and method for implementing such an in-house data communication network using existing telephone lines, wherein the DTE's (e.g. computers, appliances) can be interconnected solely by using standard interfaces, without the need for modifications or adding external units to the DTE's.

SUMMARY OF THE INVENTION

It is therefore an object of the present invention to provide a method and apparatus for upgrading an existing telephone line wiring system within a residence or other building, to provide both analog telephony service and a local area data network featuring a serial "daisy chained" or other arbitrary topology.

To this end, the regular telephone outlets are first replaced with network outlets to allow splitting of the telephone line having two or more conductors into segments such that each segment connecting two network outlets is fully separated from all other segments. Each segment has two ends, to which various devices, other segments, and so forth, may be connected via the network outlets, and are such that the segments can concurrently transport telephony and data communications signals. A network outlet contains a low pass filter, which is connected in series to each end of the segment, thereby forming a low-frequency between the external ports of the low pass filters, utilizing the low-frequency band. Similarly, a network outlet contains a high pass filter, which is connected in series to each end of the segment, thereby forming a high-frequency path between the external ports of the high pass filters, utilizing the high-frequency band The bandwidth carried by the segments is thereby split into non-overlapping frequency bands, and the distinct paths can be inter-connected via the high pass filters and low pass filters as coupling and isolating devices to form different paths. Depending on how the devices and paths are selectively connected, these paths may be simultaneously different for different frequencies. A low-frequency band is allocated to regular telephone service (analog telephony), while a high-frequency band is allocated to the data communication network. In the low-frequency (analog telephony) band, the wiring composed of the coupled low-frequency paths appears as a normal telephone line, in such a way that the low-frequency (analog telephony) band is coupled among all the segments and is accessible to telephone devices at any network outlet, whereas the segments may remain individually isolated in the high-frequency (data) band, so that in this data band the communication media, if desired, can appear to be point-to-point (such as a serialized "daisy chain") from one network outlet to the next. The term "low pass filter" herein denotes any device that passes signals in the low-frequency (analog telephony) band but blocks signals in the high-frequency (data) band. Conversely, the term "high pass filter" herein denotes any device that passes signals in the high-frequency (data) band but blocks signals in the low-frequency (analog telephony) band. The term "data device" herein denotes any apparatus that handles digital data, including without limitation modems, transceivers, Data Communication Equipment, and Data Terminal Equipment.

Each network outlet has a standard data interface connector which is coupled to data interface circuitry for establishing a data connection between one or more segments and a data device, such as Data Terminal Equipment, connected to the data interface connector.

A network according to the present invention allows the telephone devices to be connected as in a normal telephone installation (i.e., in parallel over the telephone lines), but can be configured to virtually any desired topology for data transport and distribution, as determined by the available existing telephone line wiring and without being constrained to any predetermined data network topology. Moreover, such a network offers the potential for the improved data transport and distribution performance of a point-to-point network topology, while still allowing a bus-type data network topology in all or part of the network if desired. This is in contrast to the prior art, which constrains the network topology to a predetermined type.

Data Terminal Equipment as well as telephone devices can be readily connected to the network outlets using standard interfaces and connectors, thereby allowing a data communications network as well as a telephone system to be easily configured, such that both the data communications network and the telephone system can operate simultaneously without interference between one another.

A network according to the present invention may be used advantageously when connected to external systems and networks, such as xDSL, ADSL, as well as the Internet.

In a first embodiment, the high pass filters are connected in such a way to create a virtual 'bus' topology for the high-frequency band, allowing for a local area network based on DCE units or transceivers connected to the segments via the high pass filters. In a second embodiment, each segment end is connected to a dedicated modem, hence offering a serial point-to-point daisy chain network. In all embodiments of the present invention, DTE units or other devices connected to the DCE units can communicate over the telephone line without interfering with, or being affected by, simultaneous analog telephony service. Unlike prior-art networks, the topology of a network according to the present invention is not constrained to a particular network topology determined in advance, but can be adapted to the configuration of an existing telephone line installation. Moreover, embodiments of the present invention that feature point-to-point data network topologies exhibit the superior performance characteristics that such topologies offer over the bus network topologies of the prior art, such as the Dichter network and the Crane network.

Therefore, according to a first aspect of the present invention there is provided a local area network within a building, for transporting data among a plurality of data devices, the local area network including:

(a) at least two network outlets, each of said network outlets having:
  i) at least one data interface connector and data interface circuitry coupled to said data interface connector and operative to establishing a data connection between a data device and said data interface connector;
  ii) at least one standard telephone connector operative to supporting standard telephony service by connecting a standard telephone device;
  iii) a splitter operative to separating telephony and data communications signals; and
  iv) a coupler operative to combining telephony and data communications signals;

(b) at least one telephone line segment within the walls of the building, each said telephone line segment connecting at least two of said network outlets and having at least two conductors, said telephone line segment operative to concurrently transporting telephony and data communication signals; and (c) at least one modem housed within each of said network outlets for establishing a data connection over said at least one telephone line segment, said at least one modem operative to transmitting and receiving signals over said telephone line segment, and coupled thereto.

According to a second aspect of the invention there is provided a network outlet for configuring a local area network for the transport of data across telephone lines and for enabling telephony across the telephone lines simultaneous with the transport of data, the network outlet comprising:

(a) at least one data interface connector and data interface circuitry coupled to said at least one data interface connector and being jointly operative to establishing a data connection between a data device and said at least one data interface connector;

(b) at least one telephone connector operative to supporting standard telephony service by connecting a standard telephone device thereto;

(c) a splitter adapted to be coupled to the telephone lines and being operative to separating telephony and data communications signals transported over the telephone lines; and (d) a coupler having an output adapted to be coupled to the telephone lines and being operative to combining telephony and data communications signals to be transported over the telephone lines.

According to a third aspect, the invention provides a method for upgrading an existing telephone system to operate both for telephony and as a local area network for transporting data among a plurality of data devices, the telephone system having a plurality of telephone outlets connected to at least one telephone line within the walls of a building, the method comprising the steps of:

(a) mechanically removing at least two of the telephone outlets from the walls of the building;

(b) electrically disconnecting said at least two telephone outlets from the at least one telephone line;

(c) providing at least two network outlets, each of said network outlets having a data interface connector and data interface circuitry coupled to said data interface connector and operative to establishing a data connection between a data device and said data interface connector;

(d) electrically connecting said network outlets to the at least one telephone line; and (e) mechanically securing said network outlets to the wall.

BRIEF DESCRIPTION OF THE DRAWINGS

The invention is herein described, by way of non-limiting example only, with reference to the accompanying drawings, wherein.

DETAILED DESCRIPTION OF PREFERRED EMBODIMENTS

Figure 1:
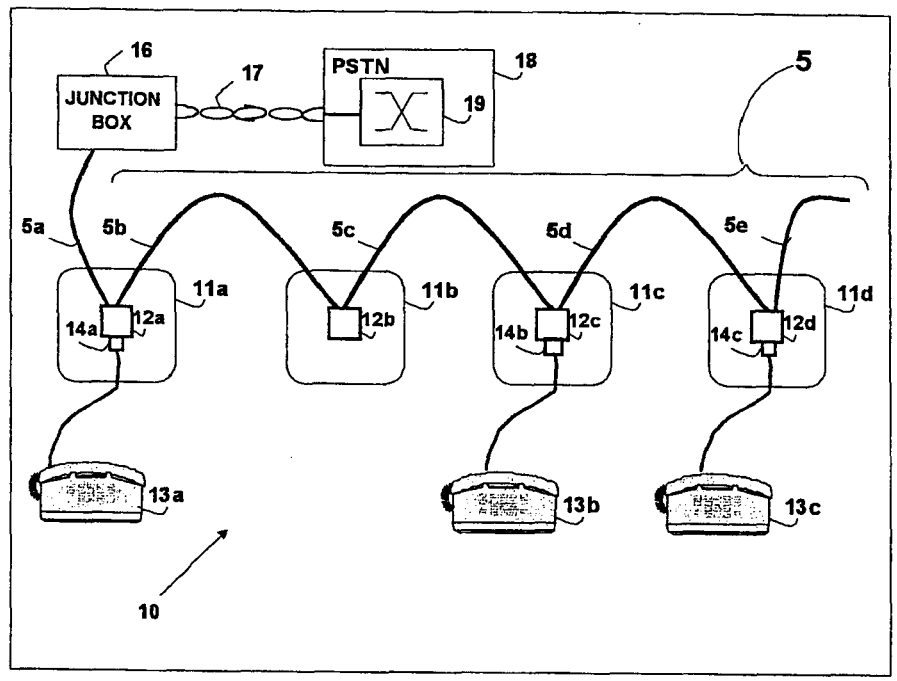
FIG. 1 shows a common prior art telephone line wiring configuration for a residence or other building.

The principles and operation of a network according to the present invention may be understood with reference to the drawings and the accompanying description. The drawings and descriptions are conceptual only. In actual practice, a single component can implement one or more functions; alternatively, each function can be implemented by a plurality of components and circuits. In the drawings and descriptions, identical reference numerals indicate those components which are common to different embodiments or configurations.

Figure 3:
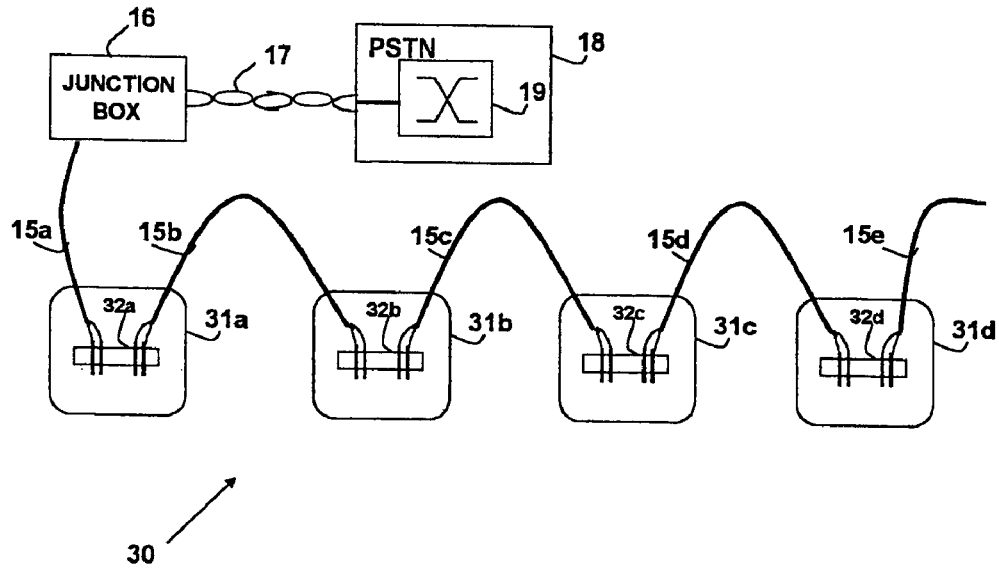
FIG. 3 shows modifications to telephone line wiring according to the present invention for a local area network.

The basic concept of the invention is shown in FIG. 3. A network 30 is based on network outlets 31a, 31b, 31c, and 31d. The installation of a network supporting both telephony and data communications relates to the installation of such network outlets. Similarly, the upgrade of an existing telephone system relates to replacing the existing telephone outlets with network outlets. In the descriptions which follow, an upgrade of an existing telephone system is assumed, but the procedures can also be applied in a like manner for an initial installation that supports both telephony and data communications.

A network outlet is physically similar in size, shape, and overall appearance to a standard telephone outlet, so that a network outlet can be substituted for a standard telephone outlet in the building wall. No changes are required in the overall telephone line layout or configuration. The wiring is changed by separating the wires at each network outlet into distinct segments of electrically-conducting media. Thus, each segment connecting two network outlets can be individually accessed from either end. In the prior art Dichter network, the telephone wiring is not changed, and is continuously conductive from junction box 16 throughout the system. According to the present invention, the telephone line is broken into electrically distinct isolated segments 15a, 15b, 15c, 15d, and 15e, each of which connects two network outlets. In order to fully access the media, each of connectors 32a, 32b, 32c, and 32d must support four connections, two in each segment. This modification to the telephone line can be carried out by replacing each of the telephone outlets 31a, 31b, 31c, and 31d. As will be explained later, the substitutions need be performed only at those places where it is desirable to be able to connect to data network devices. A minimum of two telephone outlets must be replaced with network outlets, enabling data communication between those network outlets only.

Figure 4:
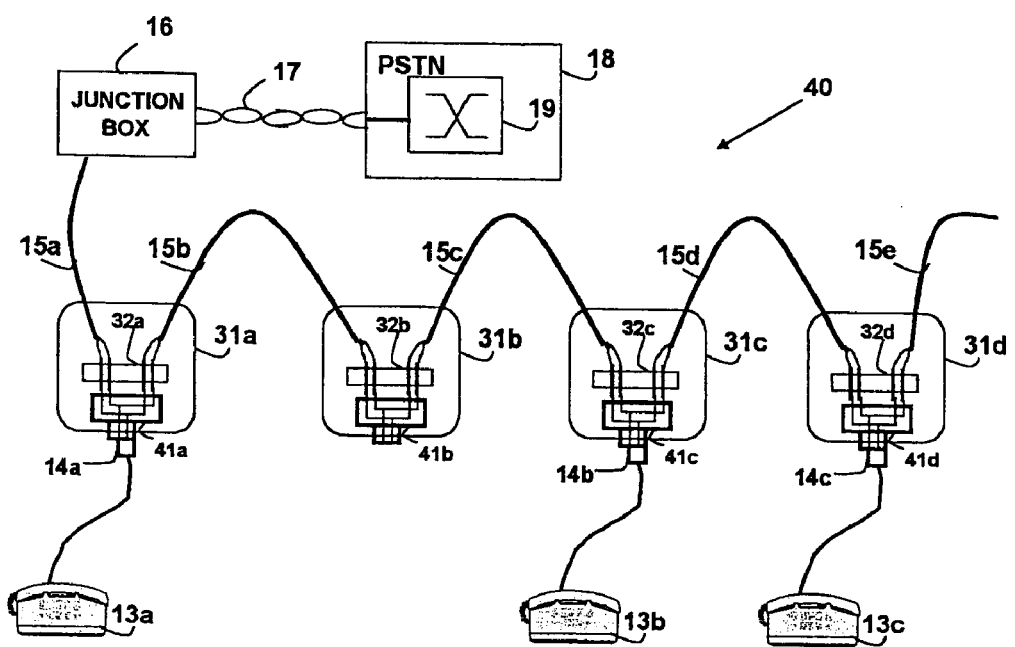
FIG. 4 shows modifications to telephone line wiring according to the present invention, to support regular telephone service operation.

FIG. 4 shows how a network 40 of the present invention continues to support regular telephone service, by the installation of jumpers 41a, 41b, 41c, and 41d in network outlets 31a, 31b, 31c and 31d respectively. At each network outlet where they are installed, the jumpers connect both segment ends and allow telephone connection to the combined segment. Installation of a jumper effects a re-connection of the split telephone line at the point of installation. Installation of jumpers at all network outlets would reconstruct the prior art telephone line configuration as shown in FIG. 1. Such jumpers can be add-ons to the network outlets, integrated within the network outlets, or integrated into a separate module. Alternately, a jumper can be integrated within a telephone set, as part of connector 14. The term "jumper" herein denotes any device for selectively coupling or isolating the distinct segments in a way that is not specific to the frequency band of the coupled or isolated signals. Jumper 41 can be implemented with a simple electrical connection between the connection points of connector 32 and the external connection of the telephone.

As described above, jumpers 41 are to be installed in all network outlets which are not required for connection to the data communication network. Those network outlets which are required to support data communication connections, however, will not use jumper 41 but rather a splitter 50, shown in FIG. 5. Such a splitter connects to both segments in each network outlet 31 via connector 32, using a port 54 for a first connection and a port 55 for a second connection. Splitter 50 has two LPF's for maintaining the continuity of the audio/telephone low-frequency band. After low pass filtering by LPF 51a for the port 54 and LPF 51b for port 55, the analog telephony signals are connected together and connected to a telephone connector 53, which may be a standard telephone connector. Hence, from the telephone signal point of view, the splitter 50 provides the same continuity and telephone access provided by the jumper 41. On the other hand, the data communication network employs the high-frequency band, access to which is made via HPF's 52a and 52b. HPF 52a is connected to port 54 and HPF 52b is connected to port 55. The high pass filtered signals are not passed from port 54 to port 55, but are kept separate, and are routed to a data interface connector 56 and a data interface connector 57, respectively, which may be standard data connectors. The term "splitter" herein denotes any device for selectively coupling or isolating the distinct segments that is specific to the frequency band of the coupled or isolated signals. The term "coupler" is used herein in reference to any device used for combining separate signals into a combined signal encompassing the originally-separate signals, including a device such as a splitter used for signal coupling.

Therefore, when installed in a network outlet, splitter 50 serves two functions. With respect to the low-frequency analog telephony band, splitter 50 establishes a coupling to effect the prior-art configuration shown in FIG. 1, wherein all telephone devices in the premises are connected virtually in parallel via the telephone line, as if the telephone line were not broken into segments. On the other hand, with respect to the high-frequency data communication network, splitter 50 establishes electrical isolation to effect the configuration shown in FIG. 3, wherein the segments are separated, and access to each segment end is provided by the network outlets. With the use of splitters, the telephone system and the data communication network are actually decoupled, with each supporting a different topology.

Figure 6:
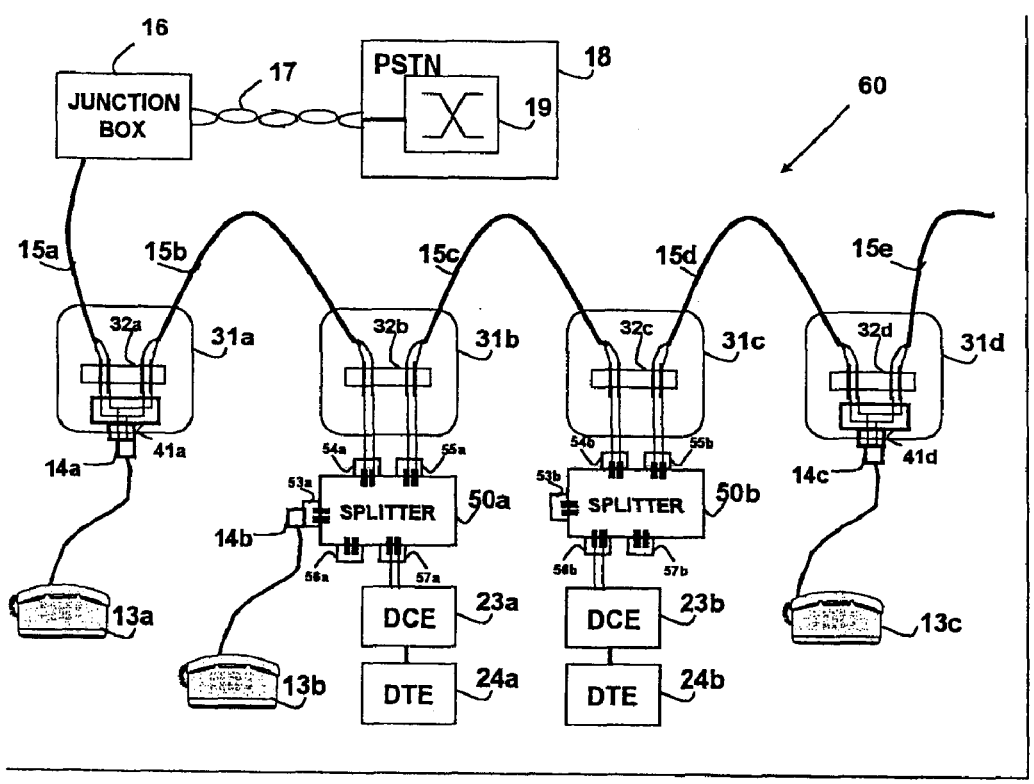
FIG. 6 shows a local area network based on telephone lines according to the present invention, wherein the network supports two devices at adjacent network outlets.

FIG. 6 shows a first embodiment of a data communication network 60 between two DTE units 24a and 24b, connected to adjacent network outlets 31b and 31c, which are connected together via a single segment 15c. Splitters 50a and 50b are connected to network outlets 31b and 31c via connectors 32b and 32c, respectively. As explained above, the splitters allow transparent audio/telephone signal connection. Thus, for analog telephony, the telephone line remains virtually unchanged, allowing access to telephone external connection 17 via junction box 16 for telephones 13a and 13c. Likewise, telephone 13b connected via connector 14b to a connector 53a on splitter 50a, is also connected to the telephone line. In a similar way, an additional telephone can be added to network outlet 31c by connecting the telephone to connector 53b on splitter 50b. It should be clear that connecting a telephone to a network outlet, either via jumper 41 or via splitter 50 does not affect the data communication network.

Figure 5:
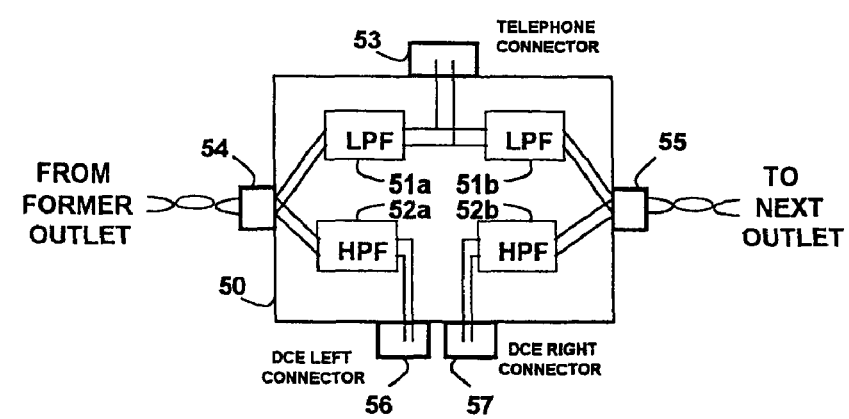
FIG. 5 shows a splitter according to the present invention.

Network 60 (FIG. 6) supports data communication by providing a communication path between port 57a of splitter 50a and port 56b of splitter 50b. Between those ports there exists a point-to-point connection for the high-frequency portion of the signal spectrum, as determined by HPF 52a and 52b within splitters 50 (FIG. 5). This path can be used to establish a communication link between DTE units 24a and 24b, by means of DCE units 23a and 23b, which are respectively connected to ports 57a and 56b. The communication between DTE units 24a and 24b can be unidirectional, half-duplex, or full-duplex. The only limitation imposed on the communication system is the capability to use the high-frequency portion of the spectrum of segment 15c. As an example, the implementation of data transmission over a telephone line point-to-point system described in Reichert can also be used in network 60. Reichert implements both LPF and HPF by means of a transformer with a capacitor connected in the center-tap, as is well-known in the art. Similarly, splitter 50 can be easily implemented by two such circuits, one for each side.

It should also be apparent that HPF 52a in splitter 50a and IPF 52b in splitter 50b can be omitted, because neither port 56a in splitter 50a nor port 57b in splitter 50b is connected.

Network 60 provides clear advantages over the networks described in the prior art. First, the communication media supports point-to-point connections, which are known to be superior to multi-tap (bus) connections for communication performance. In addition, terminators can be used within each splitter or DCE unit, providing a superior match to the transmission line characteristics. Furthermore, no taps (drops) exists in the media, thereby avoiding impedance matching problems and the reflections that result therefrom.

Moreover, the data communication system in network 60 is isolated from noises from both the network and the 'left' part of the telephone network (Segments 15a and 15b), as well as noises induced from the 'right' portion of the network (Segments 15d and 15e). Such isolation is not provided in any prior-art implementation. Dichter suggests installation of a low pass filter in the junction box, which is not a satisfactory solution since the junction box is usually owned by the telephone service provider and cannot always be accessed. Furthermore, safety issues such as isolation, lightning protection, power-cross and other issues are involved in such a modification.

Implementing splitter 50 by passive components only, such as two transformers and two center-tap capacitors, is also advantageous, since the reliability of the telephone service will not be degraded, even in the case of failure in any DCE unit, and furthermore requires no external power. This accommodates a 'life-line' function, which provides for continuous telephone service even in the event of other system malfunction (e.g. electrical failures).

The splitter 50 can be integrated into network outlet 31. In such a case, network outlets equipped with splitter 50 will have two types of connectors: One regular telephone connector based on port 53, and one or two connectors providing access to ports 56 and 57 (a single quadruple-circuit connector or two double-circuit connectors). Alternatively, splitter 50 can be an independent module attached as an add-on to network outlet 31. In another embodiment, the splitter is included as part of DCE 23. However, in order for network 60 to operate properly, either jumper 41 or splitter 50 must be employed in network outlet 31 as modified in order to split connector 32 according to the present invention, allowing the retaining of regular telephone service.

Figure 7:
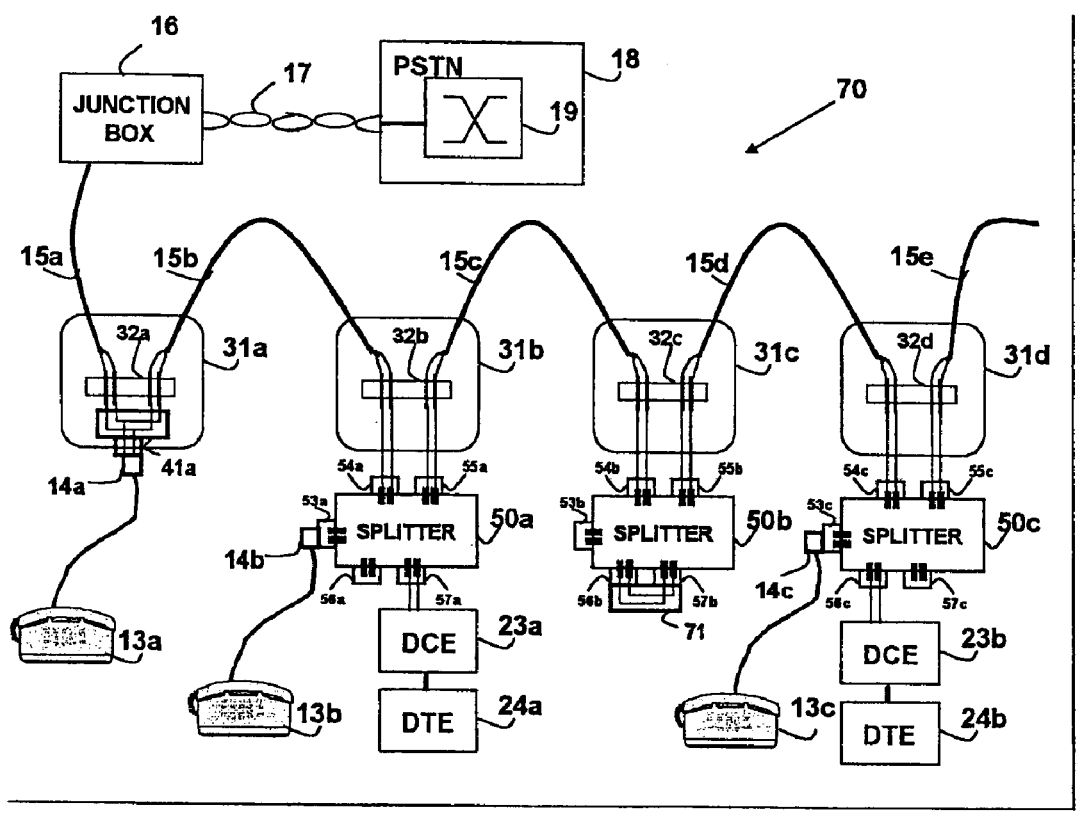
FIG. 7 shows a first embodiment of a local area network based on telephone lines according to the present invention, wherein the network supports two devices at non-adjacent network outlets.

FIG. 7 also shows data communication between two DTE units 24a and 24b in a network 70. However, in the case of network 70, DTE units 24a and 24b are located at network outlets 31b and 31d, which are not directly connected, but have an additional network outlet 31c interposed between. Network outlet 31c is connected to network outlet 31b via a segment 15c, and to network outlet 31d via a segment 15d.

In one embodiment of network 70, a jumper (not shown, but similar to jumper 41 in FIG. 4) is connected to a connector 32c in network outlet 31c. The previous discussion regarding the splitting of the signal spectrum also applies here, and allows for data transport between DTE units 24a and 24b via the high-frequency portion of the spectrum across segments 15c and 15d. When only jumper 41 is connected at network outlet 31c, the same point-to-point performance as previously discussed can be expected; the only influence on communication performance is from the addition of segment 15d, which extends the length of the media and hence leads to increased signal attenuation. Some degradation, however, can also be expected when a telephone is connected to jumper 41 at network outlet 31c. Such degradation can be the result of noise produced by the telephone in the high-frequency data communication band, as well as the result the addition of a tap caused by the telephone connection, which usually has a non-matched termination. Those problems can be overcome by installing a low pass filter in the telephone.

In a preferred embodiment of network 70, a splitter 50b is installed in network outlet 31c. Splitter 50b provides the LPF functionality, and allows for connecting a telephone via connector 53b. However, in order to allow for continuity in data communication, there must be a connection between the circuits in connectors 56b and 57b. Such a connection is obtained by a jumper 71, as shown in FIG. 7. Installation of splitter 50b and jumper 71 provides good communication performance, similar to network 60 (FIG. 6). From this discussion of a system wherein there is only one unused network outlet between the network outlets to which the DTE units are connected, it should be clear that the any number of unused network outlets between the network outlets to which the DTE units are connected can be handled in the same manner.

Figure 8:
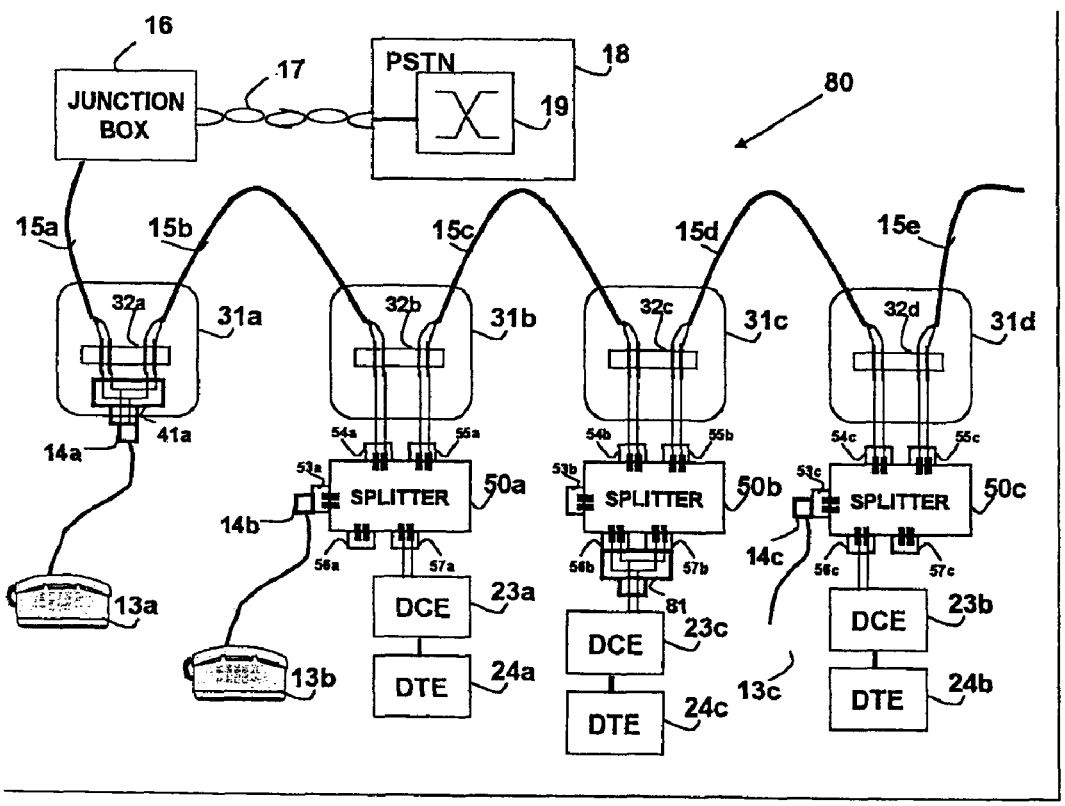
FIG. 8 shows a second embodiment of a local area network based on telephone lines according to the present invention, wherein the network supports three devices at adjacent network outlets.

For the purpose of the foregoing discussions, only two communicating DTE units have been described. However, the present invention can be easily applied to any number of DTE units. FIG. 8 illustrates a network 80 supporting three DTE units 24a, 24b, and 24c, connected thereto via DCE units 23a, 23b, and 23c, respectively. The structure of network 80 is the same as that of network 70 (FIG. 7), with the exception of the substitution of jumper 71 with a jumper 81. Jumper 81 makes a connection between ports 56b and 57b in the same way as does jumper 71. However, in a manner similar to that of jumper 41 (FIG. 4), jumper 81 further allows for an external connection to the joined circuits, allowing the connection of external unit, such as a DCE unit 23c. In this way, segments 15c and 15d appear electrically-connected for high-frequency signals, and constitute media for a data communication network connecting DTE units 24a, 24b, and 24c. Obviously, this configuration can be adapted to any number of network outlets and DTE units. In fact, any data communication network which supports a 'bus' or multi-point connection over two-conductor media, and which also makes use of the higher-frequency part of the spectrum can be used. In addition, the discussion and techniques explained in the Dichter patent are equally applicable here. Some networks, such as Ethernet IEEE 802.3 interface 10BaseT and 100BaseTX, require a four-conductor connection, two conductors (usually single twisted-wire pair) for transmitting, and two conductors (usually another twisted-wire pair) for receiving. As is known in the art, a four-to-two wires converter (commonly known as hybrid) can be used to convert the four wires required into two, thereby allowing network data transport over telephone lines according to the present invention. A network according to the present invention can therefore be an Ethernet network.

As with jumper 41 (FIG. 4), jumper 81 can be an integral part of splitter 50, an integral part of DCE 23, or a separate component.

In order to simplify the installation and operation of a network, it is beneficial to use the same equipment in all parts of the network. One such embodiment supporting this approach is shown in for a set of three similar network outlets in FIG. 8, illustrating network 80. In network 80, network outlets 31b, 31c, and 31d are similar and are all used as part of the data communication network. Therefore for uniformity, these network outlets are all coupled to splitters 50a, 50b, and 50c respectively, to which jumpers are attached, such as a jumper 81 attached to splitter 50b (the corresponding jumpers attached to splitter 50a and splitter 50c have been omitted from FIG. 8 for clarity), and thus provide connections to local DCE units 23a, 23c, and 23b, respectively. In a preferred embodiment of the present invention, all telephone outlets in the building will be replaced by network outlets which include both splitter 50 and jumper 81 functionalities. Each such network outlet will provide two connectors: one connector coupled to port 53 for a telephone connection, and the other connector coupled to jumper 81 for a DCE connection.

The terms "standard connector", "standard telephone connector", and "standard data connector" are used herein to denote any connectors which are industry-standard or de facto standard connectors. Likewise, the term "standard telephone device" is used herein to denote any telephone device which is a commercial standard or de facto standard telephone device, and the term "standard telephony service" is used herein to denote any commercially-standard or de facto standard telephony.

In yet another embodiment, DCE 23 and splitter 50 are integrated into the housing of network outlet 31, thereby offering a direct DTE connection. In a preferred embodiment, a standard DTE interface is employed.

Figure 9:
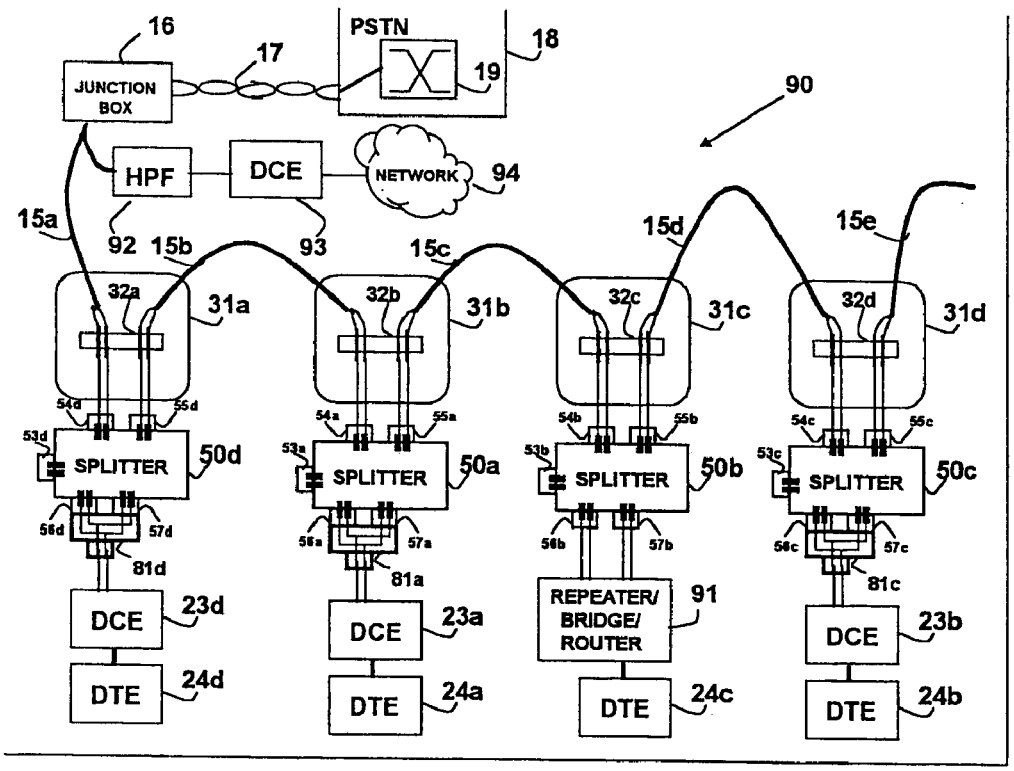
FIG. 9 shows third embodiment of a local area network based on telephone lines according to the present invention, wherein the network is a bus type network.

In most 'bus' type networks, it is occasionally required to split the network into sections, and connect the sections via repeaters (to compensate for long cabling), via bridges (to decouple each section from the others), or via routers. This may also be according to the present invention, as illustrated in FIG. 9 for a network 90, which employs a repeater/bridge/router unit 91. Unit 91 can perform repeating, bridging, routing, or any other function associated with a split between two or more networks. As illustrated, a splitter 50b is coupled to a network outlet 31c, in a manner similar to the other network outlets and splitters of network 90. However, at splitter 50b, no jumper is employed. Instead, a repeater/bridge/router unit 91 is connected between port 56b and port 57b, thereby providing a connection between separate parts of network 90. Optionally, unit 91 can also provide an interface to DTE 24c for access to network 90.

As illustrated above, a network outlet can also function as a repeater by the inclusion of the appropriate data interface circuitry. Circuitry implementing modems, and splitters, such as the high pass filters as well as the low pass filters, can function as data interface circuitry.

FIG. 9 also demonstrates the capability of connecting to external DTE units or networks, via a high pass filter 92 connected to a line 15a. Alternatively, HPF 92 can be installed in junction box 16. HPF 92 allows for additional external units to access network 90. As shown in FIG. 9, HPF 92 is coupled to a DCE unit 93, which in turn is connected to a network 94. In this configuration, the local data communication network in the building becomes part of network 94. In one embodiment, network 94 offers ADSL service, thereby allowing the DTE units 24d, 24a, 24c, and 24b within the building to communicate with the ADSL network. The capability of communicating with external DTE units or networks is equally applicable to all other embodiments of the present invention, but for clarity is omitted from the other drawings.

Figure 10:
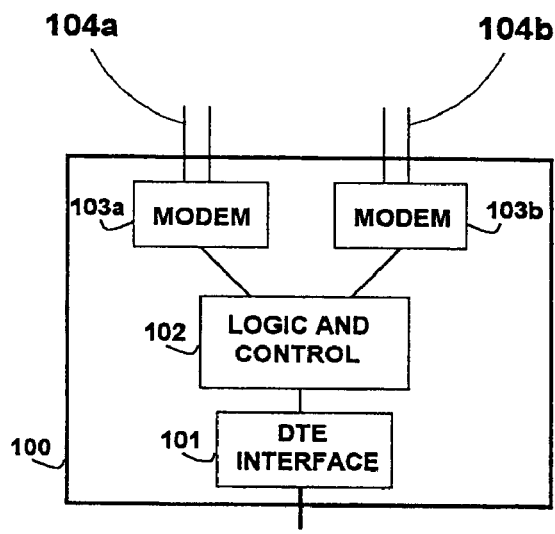
FIG. 10 shows a node of local area network based on telephone lines according to the present invention.

While the foregoing relates to data communication networks employing bus topology, the present invention can also support networks where the physical layer is distinct within each communication link. Such a network can be a Token-Passing or Token-Ring network according to IEEE 802, or preferably a PSIC network as described in U.S. Pat. No. 5,841,360 to the present inventor, which details the advantages of such a topology. FIG. 10 illustrates a node 100 for implementing such a network. Node 100 employs two modems 103a and 103b, which handle the communication physical layer. Modems 103a and 103b are independent, and couple to dedicated communication links 104a and 104b, respectively. Node 100 also features a DTE interface 101 for connecting to a DTE unit (not shown). A control and logic unit 102 manages the higher OSI layers of the data communication above the physical layer, processing the data to and from a connected DTE and handling the network control. Detailed discussion about such node 100 and the functioning thereof can be found in U.S. Pat. No. 5,841,360 and other sources known in the art.

Figure 11A:
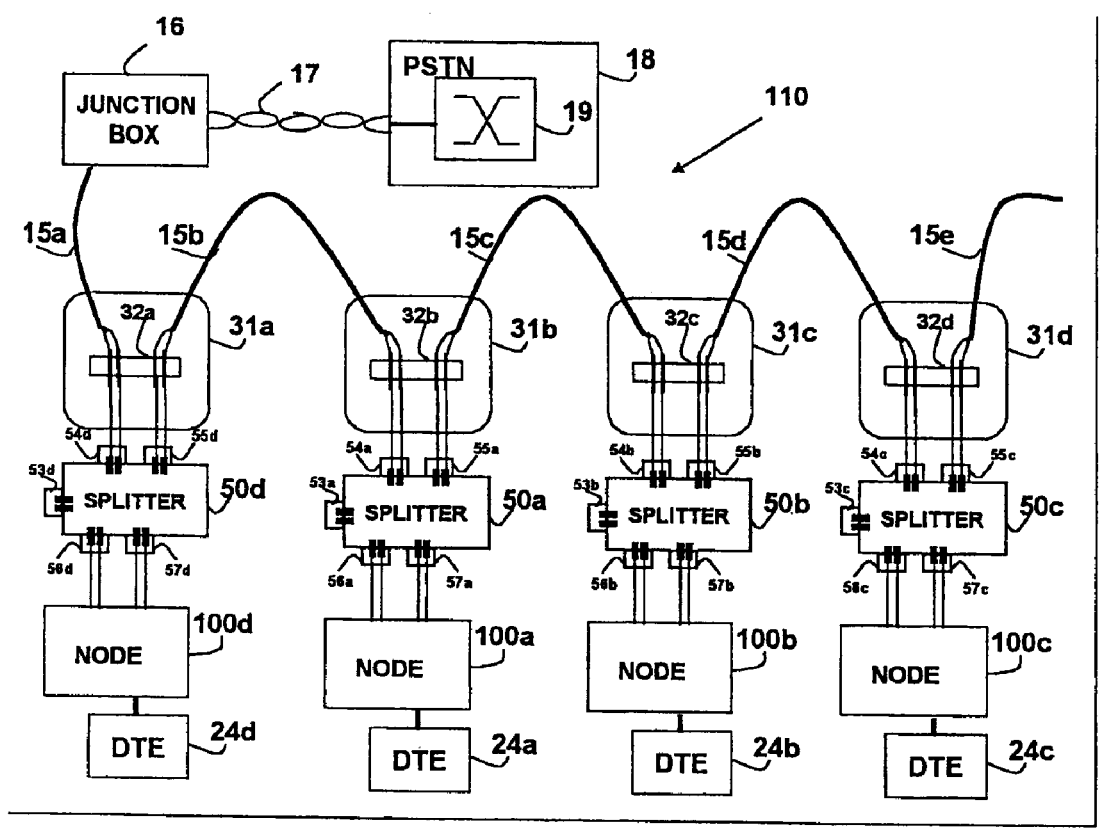
FIG. 11A shows a fourth embodiment of a local area network based on telephone lines according to the present invention.

FIG. 11 describes a network 110 containing nodes 100d, 100a, 100b, and 100c coupled directly to splitters 50d, 50a, 50b and 50c, which in turn are coupled to network outlets 31a, 31b, 31c, and 31d respectively. Each node 100 has access to the corresponding splitter 50 via two pairs of contacts, one of which is to connector 56 and the other of which is to connector 57. In his way, for example, node 100a has independent access to both segment 15b and segment 15c. This arrangement allows building a network connecting DTE units 24d, 24a, 24b, and 24c via nodes 100d, 100a, 100b, and 100c, respectively.

For clarity, telephones are omitted from FIGS. 9 and 11, but it should be clear that telephones can be connected or removed without affecting the data communication network. Telephones can be connected as required via connectors 53 of splitters 50. In general, according to the present invention, a telephone can be connected without any modifications either to a splitter 50 (as in FIG. 8) or to a jumper 41 (as in FIG. 4).

Figure 2:
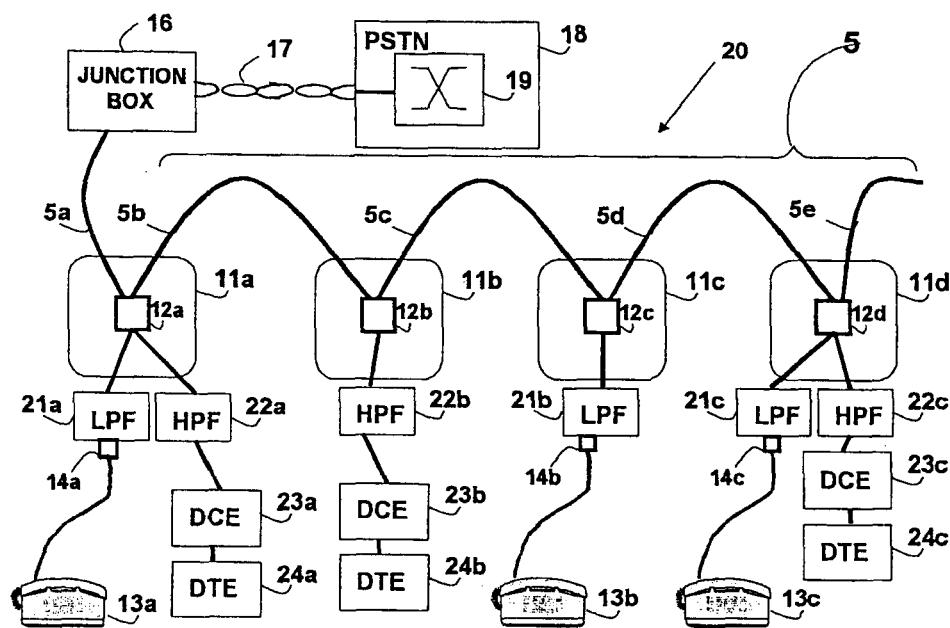
FIG. 2 shows a prior art local area network based on telephone line wiring for a residence or other building.

The present invention has been so far described in embodiments in which the telephone wiring segments are split, and which therefore modify the original galvanic continuity of the telephone wiring, as shown in FIG. 3. Such embodiments require the removal of outlets in order to access the internal wiring. However, the present invention can be applied equally-well to prior-art schemes such as the Dichter network (as illustrated in FIG. 2), wherein the continuity of the telephone wiring is not disturbed, and there the wiring is not split into electrically distinct segments.

Figure 11B:
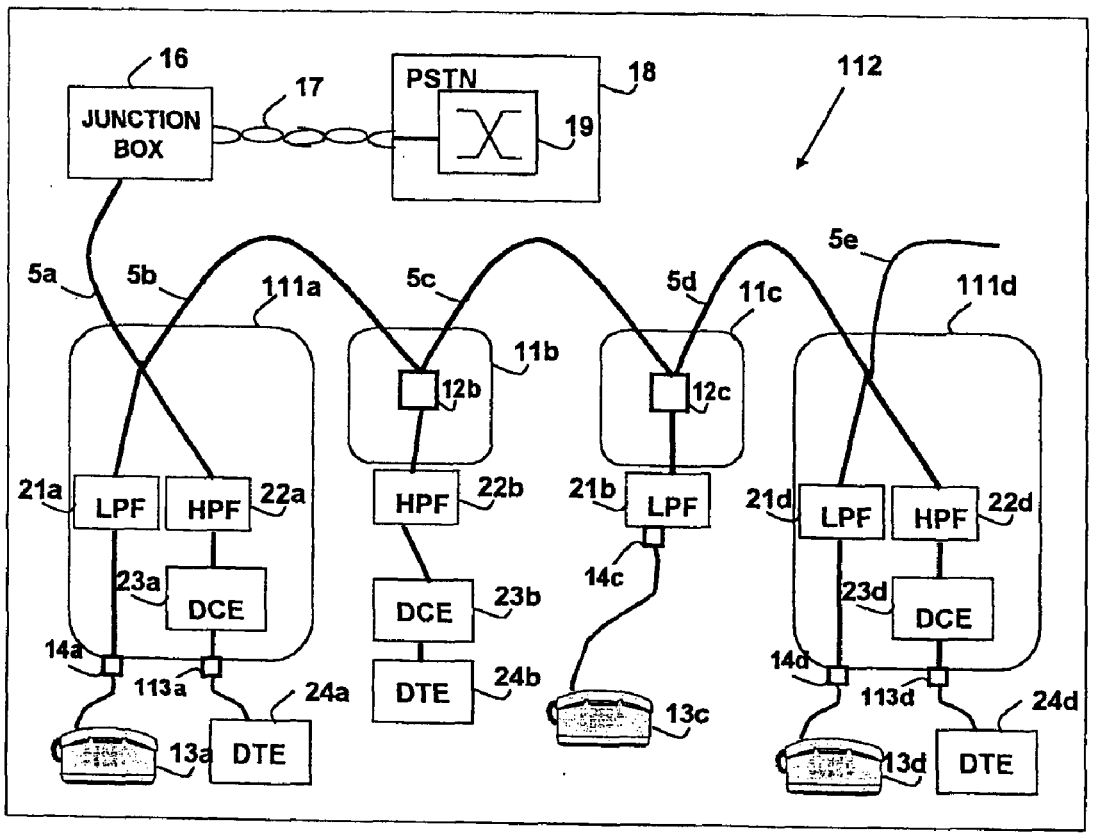
FIG. 11B shows an embodiment of the present invention for use with telephone wiring that is not separated into distinct segments.

Thus, an embodiment of a network utilizing the network outlets of the present invention is shown in FIG. 11B as a network 112. Generally, the Dichter network of FIG. 2 is employed. However, network outlets 11a and 11b (corresponding to network outlets 11a and 11d of FIG. 2) are modified so that all components are housed therein. In such a case, the splitter/combiner is a single low pass filter 21 and a single high pass filter 22. High pass filter 22 is coupled to single telephone-line modem/DCE 23. A single high pass filter, a single low pass filter, and a single DCE are used, since the connection to the telephone line involves a single, point of connection. However, since point-to-point topology is not used in this case, modem 23 is expected to be more complex than in the other described embodiments. Each outlet 111 has standard telephone connector 14 for connecting the telephone set, and standard data connector 113 for the DTE connection. For example, a 10BaseT interface employing an RJ-45 connector can be used for the DTE connection.

Furthermore, although the present invention has so far been described with a single DTE connected to a single network outlet, multiple DTE units can be connected to a network outlet, as long as the corresponding node or DCE supports the requisite number of connections. Moreover, access to the communication media can be available for plurality of users using multiplexing techniques known in the art. In the case of time domain/division multiplexing (TDM) the whole bandwidth is dedicated to a specific user during a given time interval. In the case of frequency domain/division multiplexing (FDM), a number of users can share the media simultaneously, each using different non-overlapping portions of the frequency spectrum.

In addition to the described data communication purposes, a network according to the present invention can be used for control (e.g. home automation), sensing, audio, or video applications, and the communication can also utilize analog signals (herein denoted by the term "analog communication"). For example, a video signal can be transmitted in analog form via the network.

While the present invention has been described in terms of network outlets which have only two connections and therefore can connect only to two other network outlets (i.e., in a serial, or "daisy chain" configuration), the concept can also be extended to three or more connections. In such a case, each additional connecting telephone line must be broken at the network outlet, with connections made to the conductors thereof, in the same manner as has been described and illustrated for two segments. A splitter for such a multi-segment application should use one low pass filter and one high pass filter for each segment connection.

The present invention has also been described in terms of media having a single pair of wires, but can also be applied for more conductors. For example, ISDN employs two pairs for communication. Each pair can be used individually for a data communication network as described above.

Also as explained above, a network outlet 31 according to the invention (FIG. 3) has a connector 32 having at least four connection points. As an option, jumper 41 (FIG. 4), splitter 50 (FIG. 5), or splitter 50 with jumper 81 (FIG. 8), low pass filters, high pass filters, or other additional hardware may also be integrated or housed internally within network outlet 31. Moreover, the network outlet may contain standard connectors for devices, such as DTE units. In one embodiment, only passive components are included within the network outlet. For example, splitter 50 can have two transformers and two capacitors (or an alternative implementation consisting of passive components). In another embodiment, the network outlet may contain active, power-consuming components. Three options can be used for providing power to such circuits:

1. Local powering: In this option, supply power is fed locally to each power-consuming network outlet. Such network outlets must be able to support connection for input power.
2. Telephone power: In both POTS and ISDN telephone networks, power is carried in the lines with the telephone signals. This power can also be used for powering the network outlet circuits, as long as the total power consumption does not exceed the POTS/ISDN system specifications. Furthermore, in some POTS systems the power consumption is used for OFF-HOOK/ON-HOOK signaling. In such a case, the network power consumption must not interfere with the telephone logic.
3. Dedicated power carried in the media: In this option, power for the data communication related components is carried in the communication media. For example, power can be distributed using 5 kHz signal. This frequency is beyond the telephone signal bandwidth, and thus does not interfere with the telephone service. The data communication bandwidth, however, be above this 5 kHz frequency, again ensuring that there is no interference between power and signals.

Figure 12:
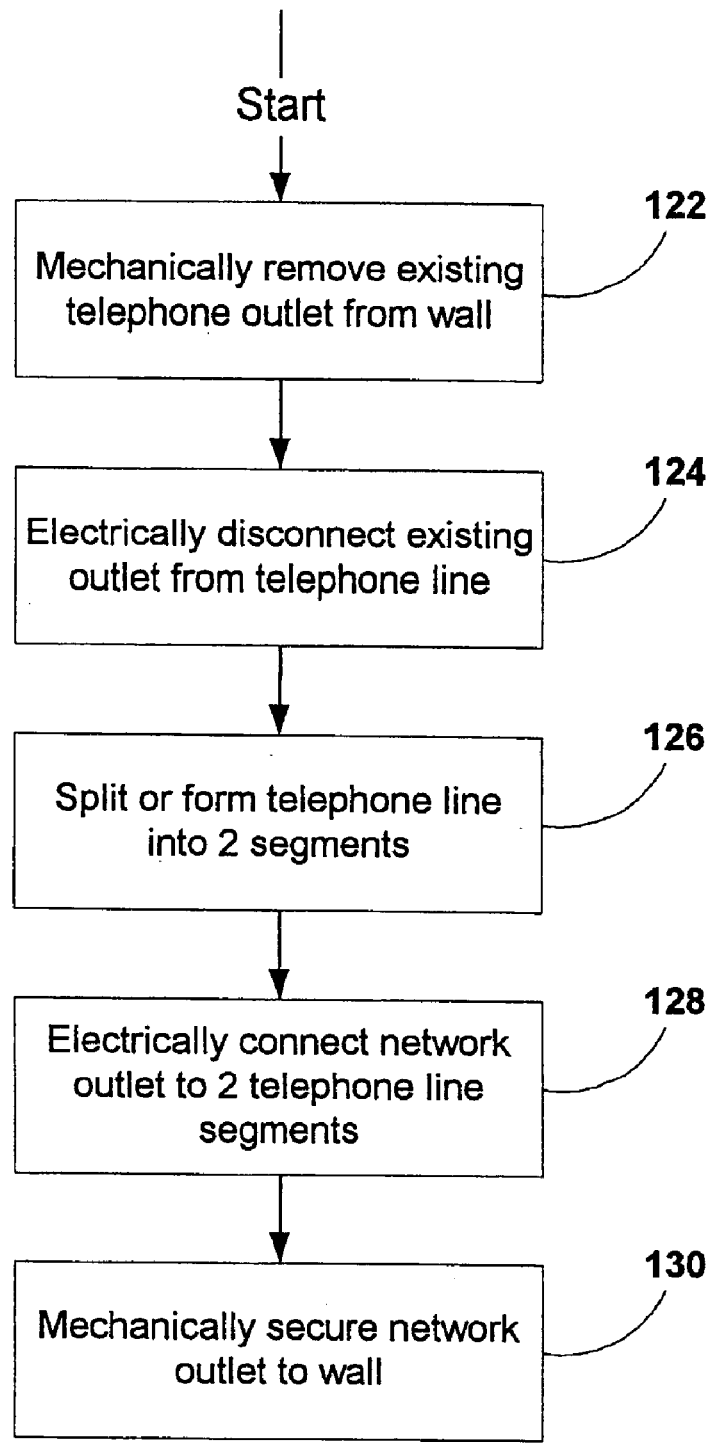
FIG. 12 is a flowchart illustrating the sequence of steps in an installation method according to the present invention for upgrading an existing telephone system.

Upgrading existing telephone lines within a building can be done by the method illustrated in the flowchart of FIG. 12. At least two telephone outlets must be replaced by network outlets in order to support data communications. For each outlet to be replaced, the steps of FIG. 12 are performed as shown. In a step 122, the existing telephone outlet is mechanically removed from the wall. Next, in a step 124, the existing telephone outlet is electrically disconnected from the telephone line. At this point in a step 126, the existing telephone line is split or formed into two isolated segments. Depending on the existing configuration of the telephone line, this could be done by cutting the telephone line into two segments, by separating two telephone lines which had previously been joined at the existing telephone outlet, or by utilizing an unused wire pair of the existing telephone line as a second segment. Then, in a step 128, the two segments are electrically connected to a new network outlet, in a manner previously illustrated in FIG. 5, where one of the segments is connected to connector 54 and the other segment is connected to connector 55. Note that separating the telephone line into two segments is not necessary in all cases. If only two network outlets are desired, the telephone line does not have to be split, because a single segment suffices to connect the two network outlets. If more than two network outlets are desired, however, the telephone line must be split or formed into more than one segment. Finally, in a step 130 (FIG. 12), the network outlet is mechanically replaced and secured into the wall in place of the original telephone outlet.

While the above description describes the non-limiting case where two wire segments are connected to the outlet (such as outlets 11a, 11b, 11c and 11d), in general it is also possible to connect a single segment or more than two segments to the outlet.

Figure 13:
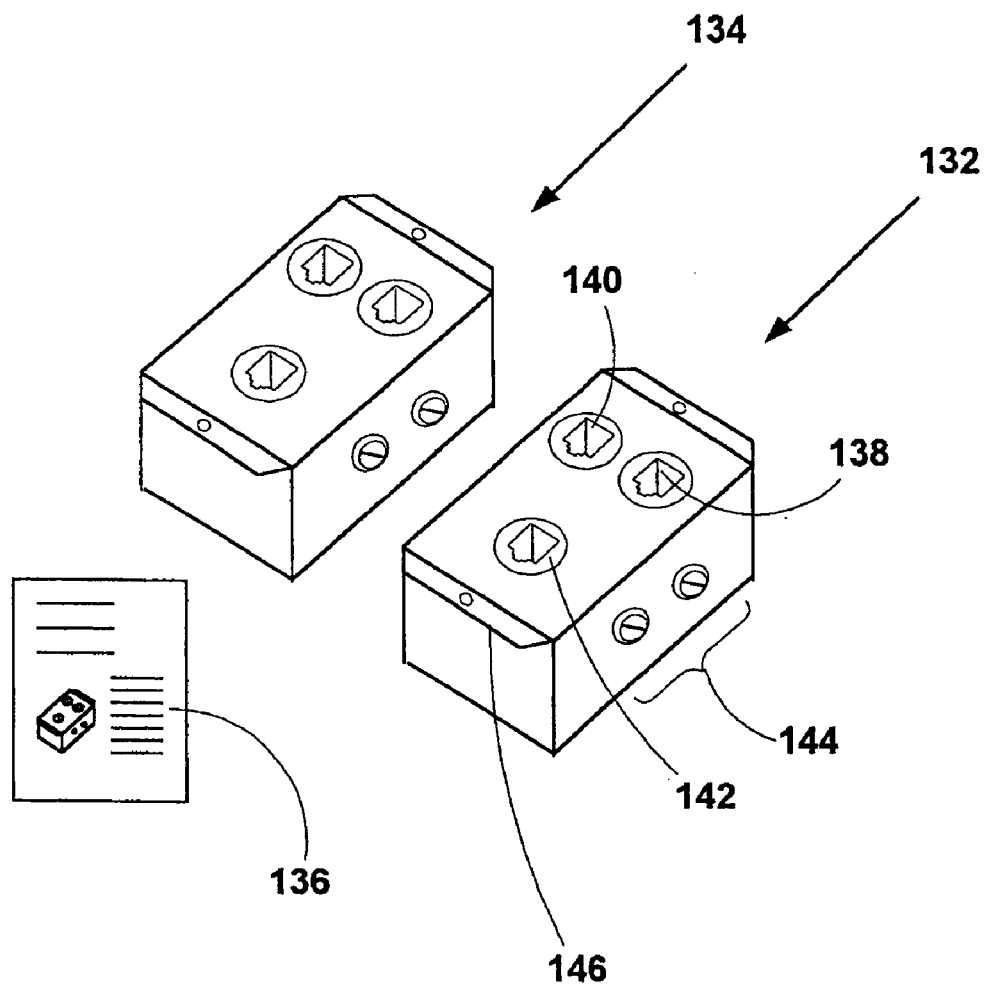
FIG. 13 illustrates the components of a basic kit according to the present invention for upgrading a telephone system to a local area data network.

In order to facilitate the upgrade of existing telephone systems for simultaneous telephony and data communications, the network outlets as described previously can be packaged in kit form with instructions for performing the method described above. As illustrated in FIG. 13, a basic kit contains two network outlets 132 and 134 with instructions 136, while supplementary kits need contain only a single network outlet 132. A network outlet 132 houses two standard data connectors 138 and 140, and a standard telephone connector 142, corresponding to connectors 57, 56, and 53, respectively, of FIG. 5. In addition, network outlet 132 has connectors 144 for electrically connecting to the segment of the telephone line. Connectors 144 correspond to connector 55 of FIG. 5 (connector 54 of FIG. 5 is omitted from FIG. 13 for clarity). Furthermore, network outlet 132 has flanges, such as a flange 146, for mechanically securing to a standard in-wall junction box. A homeowner could purchase a basic kit according to the present invention to upgrade an existing telephone system to a local area network, and then purchase whatever supplementary kits would be needed to expand the local area network to any degree desired.

While the invention has been described with respect to a limited number of embodiments, it will be appreciated that many variations, modifications and other applications of the invention may be made.

What is claimed is:

1. A device for coupling to a data signal, a power signal and a telephone signal carried by a network wiring in a building, said device comprising:

attachment means for attaching said device to support surface;

a wiring connector connectible to the network wiring;

a telephone connector coupled to said wiring connector and operative to couple a telephone unit to the telephone signal;

a data connector coupled to said wiring connector and operative to couple a data unit to the data signal; and at least one power consuming component coupled to said wiring connector in order to receive, and be powered by, the power signal;

wherein the telephone signal and the data signal are concurrently carried over the same conductors of the network wiring in respectively different frequency bands, and said device comprises a frequency selective means to separate the telephone and data signals.

2. The device according to claim 1, wherein the power signal is concurrently carried over the same conductors of the network together with the telephone and data signals in a distinct power signal band.

3. The device according to claim 1, wherein the power signal is part of the telephone signal.

4. The device according to claim 1, wherein the power signal is carried by dedicated wires of the network wiring.

5. The device according to claim 1, wherein the power signal is a direct current signal.

6. The device according to claim 1, wherein the power signal is an alternating current signal.

7. The device according to claim 1, wherein said device is at least partially integrated into an outlet.

8. A method, for use with a telephone wiring in a building concurrently carrying a data signal, a power signal and a telephone signal, for coupling to said signals via a device that includes a wiring connector and a power consuming component, the method comprising the steps of:

coupling a telephone connector to said wiring connector, the telephone connector being operative to couple the telephone signal to a telephone unit;

coupling a data connector to said wiring connector, the data connector being operative to couple the data signal to a data unit; and coupling the telephone connector and the data connector to the telephone wiring using the power consuming component;

carrying the telephone signal and the data signal concurrently over the same coductors in respective ones of a telephone frequency band and a data frequency band;

separating the telephone signal from the data signal using frequency selective means between the wiring connector and the data and telephone connectors; and powering the power consuming component by the power signal from the telephone wiring.

9. The method according to claim 8, wherein the power signal is carried in a distinct power band concurrently over the same conductors as the telephone and data signals.

10. The method according to claim 9, wherein the power signal is part of the telephone signal.

11. The method according to claim 9, wherein the power signal is carried over dedicated wires.

12. The method according to claim 9, wherein the power signal is a direct current signal.

13. The method according to claim 9, wherein the power signal is an alternating current signal.

14. The method according to claim 9, wherein the wiring connector, the telephone connector and the data connector are housed within the device.

15. The method according to claim 14, wherein the device is attached to a wall.

16. The method according to claim 9, further comprising coupling a modem between said data connector and the wiring for conducting the data signal carried over the telephone wiring.

* * * * *

UNITED STATES PATENT AND TRADEMARK OFFICE
CERTIFICATE OF CORRECTION

| | |
|---|---|
| PATENT NO. | : 6,757,368 B2 |
| APPLICATION NO. | : 10/412251 |
| DATED | : June 29, 2004 |
| INVENTOR(S) | : Yehuda Binder |

Page 1 of 1

It is certified that error appears in the above-identified patent and that said Letters Patent is hereby corrected as shown below:

Column 15, line 47, after "device to", insert --a--

Column 16, line 33, delete "coductors" and insert therefor --conductors--

Column 16, line 43 (claim 10, line 1), delete "9" and insert therefor --8--

Column 16, line 45 (clam 11, line 1), delete "9" and insert therefor --8--

Column 16, line 47 (claim 12, line 1), delete "9" and insert therefor --8--

Column 16, line 49 (claim 13, line 1), delete "9" and insert therefor --8--

Column 16, line 51 (claim 14, line 1), delete "9" and insert therefor --8--

Column 16, line 56 (claim 16, line 1), delete "9" and insert therefor --8--

Signed and Sealed this

Fourth Day of September, 2007

JON W. DUDAS
*Director of the United States Patent and Trademark Office*